(12) United States Patent
Tanaka

(10) Patent No.: US 12,462,213 B2
(45) Date of Patent: Nov. 4, 2025

(54) INFORMATION PROCESSING DEVICE, INFORMATION PROCESSING METHOD, AND DELIVERY SYSTEM

(71) Applicant: Rakuten Group, Inc., Tokyo (JP)

(72) Inventor: Daiki Tanaka, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/785,761

(22) PCT Filed: May 26, 2021

(86) PCT No.: PCT/JP2021/019971
§ 371 (c)(1),
(2) Date: Jun. 15, 2022

(87) PCT Pub. No.: WO2022/249319
PCT Pub. Date: Dec. 1, 2022

(65) Prior Publication Data
US 2024/0169304 A1    May 23, 2024

(51) Int. Cl.
*G06Q 10/0832* (2023.01)
*G05D 1/667* (2024.01)
*B64U 101/64* (2023.01)

(52) U.S. Cl.
CPC ......... *G06Q 10/0832* (2013.01); *G05D 1/667* (2024.01); *B64U 2101/64* (2023.01)

(58) Field of Classification Search
CPC .... G06Q 50/40; G06Q 10/0832; G05D 1/667; B64U 2101/64
USPC ....................................................... 705/332
See application file for complete search history.

(56) References Cited

U.S. PATENT DOCUMENTS

| | | | |
|---|---|---|---|
| 2017/0032315 A1* | 2/2017 | Gupta | B64C 39/024 |
| 2017/0286892 A1* | 10/2017 | Studnicka | G06Q 20/4016 |
| 2017/0323257 A1* | 11/2017 | Cheatham, III | G06Q 10/0832 |
| 2020/0065762 A1* | 2/2020 | Briggs | G08G 5/76 |
| 2020/0300659 A1* | 9/2020 | Miwa | G01C 21/3691 |
| 2020/0354109 A1* | 11/2020 | Polus | G05D 1/02 |

FOREIGN PATENT DOCUMENTS

| | | | |
|---|---|---|---|
| AU | 2017289043 B2 * | 8/2020 | G01C 21/1652 |
| JP | 2004-307210 A | 11/2004 | |
| JP | 2007-8670 A | 1/2007 | |
| JP | 2009-193515 A | 8/2009 | |
| JP | 2018-39420 A | 3/2018 | |

(Continued)

OTHER PUBLICATIONS

Thibbotuwawa A, Bocewicz G, Radzki G, Nielsen P, Banaszak Z. UAV Mission Planning Resistant to Weather Uncertainty. Sensors (Basel). Jan. 16, 2020. pp. 1-24. (Year: 2020).*

(Continued)

*Primary Examiner* — Jeff Zimmerman
*Assistant Examiner* — Hunter Molnar
(74) *Attorney, Agent, or Firm* — Sughrue Mion, PLLC

(57) ABSTRACT

The management server 2 calculates a total weight of a plurality of articles loaded on the UAV 1 on the basis of weights of the articles included in each of a plurality of orders, and determines whether or not the unmanned aerial vehicle is capable of loading and delivering the articles included in each of the plurality of orders by comparing a loadable weight of the UAV 1 with the calculated total weight.

14 Claims, 12 Drawing Sheets

(56) References Cited

FOREIGN PATENT DOCUMENTS

| | | | |
|---|---|---|---|
| JP | 2019-6356 | A | 1/2019 |
| JP | 2019006356 | A  * | 1/2019 |
| JP | 2019-131068 | A | 8/2019 |
| JP | 6841544 | B1 | 3/2021 |

OTHER PUBLICATIONS

International Search Report for PCT/JP2021/019971, dated Jun. 29, 2021.

* cited by examiner

FIG. 12

ORDERED ITEMS

| NAME | CATEGORY | QUANTITY | WEIGHT | | DELIVERY ORDER |
|---|---|---|---|---|---|
| WATER | BEVERAGE | 2 | 800g | ⇒ | LEADING |
| ICE CREAM | FROZEN FOOD | 2 | 300g | ⇒ | FOLLOWING |
| BOX LUNCH | DELI ITEM | 2 | 700g | ⇒ | FOLLOWING |
| CANNED FOOD | PROCESSED ITEM | 1 | 800g | ⇒ | LEADING |

INFORMATION PROCESSING DEVICE, INFORMATION PROCESSING METHOD, AND DELIVERY SYSTEM

CROSS REFERENCE TO RELATED APPLICATIONS

This application is a National Stage of International Application No. PCT/JP2021/019971 filed May 26, 2021.

TECHNICAL FIELD

The present invention relates to the technical field of systems and the like for loading articles included in each of a plurality of orders on an unmanned aerial vehicle and delivering the articles to delivery destinations.

BACKGROUND ART

In order to improve the efficiency of delivering articles by the unmanned aerial vehicle, a technique is known of loading the articles included in each of the plurality of orders on the unmanned aerial vehicle and delivering the articles according to each order to each of the respective delivery destinations in one flight. For example, Patent Literature 1 discloses that a drone 1 (unmanned aerial vehicle) holding a plurality of cargos stores identification numbers of each of the cargos in association with the coordinates of each respective target position, sequentially flies from a departure position to the plurality of target positions, releases a hold of the cargos when reaching any of the target positions, then moves to the next target position.

CITATION LIST

Patent Literature

Patent Literature 1: JP 2019-131068 A

SUMMARY OF INVENTION

Technical Problem

However, Patent Literature 1 does not illustrate a relationship between a maximum weight that is loadable on the unmanned aerial vehicle and a total weight of the plurality of articles loaded on the unmanned aerial vehicle. Thus, it is difficult to efficiently determine whether or not loading and delivering the articles included in each of the plurality of orders on the unmanned aerial vehicle is possible.

Therefore, one or more embodiments of the present invention are directed to providing an information processing device, an information processing method, and a delivery system capable of efficiently determining whether or not it is possible to load and deliver the articles included in each of the plurality of orders on an unmanned aerial vehicle having a decided maximum loadable weight.

Solution to Problem

In response to the above issue, the invention according to claim 1 is an information processing device for executing a predetermined information processing using a database that stores information regarding an unmanned aerial vehicle used for an article delivery and information regarding orders of articles. The information processing device includes: a first calculation means configured to calculate a total weight of a plurality of articles loaded on the unmanned aerial vehicle on the basis of weights of the articles included in each of a plurality of orders; and a determination means configured to determine, by comparing a loadable weight of the unmanned aerial vehicle with the total weight, whether or not the unmanned aerial vehicle is capable of loading and delivering the articles included in each of the plurality of orders. This makes it possible to efficiently determine whether or not loading and delivering the articles included in each of the plurality of orders on the unmanned aerial vehicle having a decided maximum loadable weight is possible.

The invention according to claim 2 is the information processing device according to claim 1 further including a transmission means configured to transmit delivery destination information indicating delivery destinations specified by each of the plurality of orders to the unmanned aerial vehicle according to that it is determined that the unmanned aerial vehicle is capable of loading and delivering the articles by the determination means. This makes it possible to quickly set the delivery destination information indicating the delivery destinations specified by each of the plurality of orders in the unmanned mobile vehicle according to a determination that it is possible to load and deliver the articles included in each of the plurality of orders.

The invention according to claim 3 is the information processing device according to claim 1 or 2 further including: a first identifying means configured to identify a delivery route for delivering the articles included in each of the orders on the basis of the delivery destinations specified by each of the orders; and a second identifying means configured to identify a scheduled flight distance of the unmanned aerial vehicle on the basis of the delivery route. The determination means determines, further by comparing the scheduled flight distance of the unmanned aerial vehicle with a cruisable distance of the unmanned aerial vehicle, whether or not the unmanned aerial vehicle is capable of loading and delivering the articles included in each of the plurality of orders. This makes it possible to efficiently determine whether or not loading and delivering the articles included in each of the plurality of orders on the unmanned aerial vehicle having a limited cruisable distance is possible.

The invention according to claim 4 is the information processing device according to claim 3 further including a second calculation means configured to calculate the cruisable distance compared with the scheduled flight distance of the unmanned aerial vehicle on the basis of the weights of the articles included in each of the plurality of orders and a relationship between the cruisable distance and a load weight of the unmanned aerial vehicle. The second calculation means calculates the cruisable distance such that the distance increases according to the weight being reduced due to the articles included in any of the orders being detached from the unmanned aerial vehicle at the delivery destinations. This makes it possible to realize a more efficient article delivery since the cruisable distance is used in which a reducing weight at each delivery destination has been considered.

The invention according to claim 5 is the information processing device according to any one of claims 1 to 4 further including a third identifying means that identifies a plurality of orders having delivery destinations that are included in a delivery area for which a flight by the unmanned aerial vehicle is scheduled. The first calculation means calculates the total weight of the plurality of articles loaded on the unmanned aerial vehicle on the basis of the weights of the articles included in each of the plurality of orders identified by the third identifying means. This makes it possible to realize a more efficient article delivery since the orders subject to delivery can be limited.

The invention according to claim 6 is the information processing device according to any one of claims 1 to 5 further including a fourth identifying means configured to identify a plurality of orders having a specified delivery time that is included in a delivery time slot for which a flight by the unmanned aerial vehicle is scheduled. The first calculation means calculates the total weight of the plurality of articles loaded on the unmanned aerial vehicle on the basis of the weights of the articles included in each of the plurality of orders identified by the fourth identifying means. This makes it possible to realize a more efficient article delivery since the orders subject to delivery can be limited.

The invention according to claim 7 is the information processing device according to any one of claims 1 to 4 further including a fifth identifying means configured to identify a plurality of orders including articles not impacted by weather conditions in a delivery area and a delivery time slot, on the basis of attributes of the articles included in each of the plurality of orders and the weather conditions of the delivery area and the delivery time slot, from among the plurality of orders having delivery destinations that are included in the delivery area for which a flight by the unmanned aerial vehicle is scheduled and having a specified delivery time that is included in the delivery time slot for which the flight by the unmanned aerial vehicle is scheduled. The first calculation means calculates the total weight of the plurality of articles loaded on the unmanned aerial vehicle on the basis of the weights of the articles included in each of the plurality of orders identified by the fifth identifying means. Accordingly, a reduction in quality of the articles delivered to the delivery destinations due to the impact of weather conditions in the delivery area and the delivery time slot can be prevented as much as possible.

The invention according to claim 8 is the information processing device according to any one of claims 1 to 4 further including a sixth identifying means configured to identify a plurality of orders including articles not impacted by an article detachment method of the unmanned aerial vehicle, on the basis of attributes of the articles included in each of the plurality of orders and the article detachment method of the unmanned aerial vehicle, from among the plurality of orders having delivery destinations that are included in a delivery area for which a flight by the unmanned aerial vehicle is scheduled and having a specified delivery time that is included in a delivery time slot for which the flight by the unmanned aerial vehicle is scheduled. The first calculation means calculates the total weight of the plurality of articles loaded on the unmanned aerial vehicle on the basis of the weights of the articles included in each of the plurality of orders identified by the sixth identifying means. Accordingly, a reduction in quality of the articles delivered to the delivery destinations due to the impact of the article detachment method of the unmanned aerial vehicle can be prevented as much as possible.

The invention according to claim 9 is the information processing device according to any one of claims 1 to 8 further including a third calculation means configured to calculate a total volume of the plurality of articles loaded on the unmanned aerial vehicle on the basis of volumes of the articles included in each of the plurality of orders. the determination means determines, by further comparing a loadable capacity of the unmanned aerial vehicle with the total volume, whether or not the unmanned aerial vehicle is capable of loading and delivering the articles included in each of the plurality of orders. This makes it possible to efficiently determine whether or not loading and delivering the articles included in each of the plurality of orders on the unmanned aerial vehicle having a decided maximum storable capacity is possible.

The invention according to claim 10 is the information processing device according to any one of claims 1 to 9, wherein: in a case where it is determined that the unmanned aerial vehicle is not capable of loading and delivering the articles by the determination means, the first calculation means calculates the total weight of the plurality of articles loaded on the unmanned aerial vehicle on the basis of the weights of the plurality of articles included in any one order from among the plurality of orders; and the determination means determines, by comparing the loadable weight of the unmanned aerial vehicle with the total weight, whether or not the unmanned aerial vehicle is capable of loading and delivering the plurality of articles included in the one order. This makes it possible to efficiently determine whether or not loading and delivering the articles included in one order on the unmanned aerial vehicle having a decided maximum loadable weight is possible.

The invention according to claim 11 is the information processing device according to claim 10 further including a decision means configured to, in a case where it is determined that the unmanned aerial vehicle is not capable of loading and delivering the articles by the determination means, decide to divide the plurality of articles included in the order and deliver to delivery destinations over a plurality of times, and decide a delivery order of each of the articles on the basis of respective attributes of each article. Accordingly, even in a case where it is difficult to load and deliver the plurality of articles included in the one order on the unmanned aerial vehicle, it is possible to divide and deliver the plurality of articles over a plurality of times.

The invention according to claim 12 is the information processing device according to claim 11, wherein the decision means decides the delivery order of each of the articles on the basis of weather conditions in a delivery time slot for which a flight by the unmanned aerial vehicle is scheduled and a delivery area for which the flight by the unmanned aerial vehicle is scheduled, and the respective attributes of each of the articles. Accordingly, a reduction in quality of the articles delivered to the delivery destinations due to the impact of weather conditions in the delivery area and the delivery time slot can be prevented as much as possible.

The invention according to claim 13 is an information processing method performed by a computer that executes a predetermined information processing using a database that stores information regarding unmanned aerial vehicles used for an article delivery and information regarding orders of articles, the information processing method including: a step of calculating a total weight of a plurality of articles loaded on the unmanned aerial vehicle on the basis of weights of the articles included in each of a plurality of orders; and a step of comparing a loadable weight of the unmanned aerial vehicle with the total weight and determining whether or not the unmanned aerial vehicle is capable of loading and delivering the articles included in each of the plurality of orders.

The invention according to claim 14 is a delivery system including: a database configured to store information regarding unmanned aerial vehicles used for an article delivery and information regarding orders of articles; an acquisition unit configured to acquire weights of a plurality of articles loaded on the unmanned aerial vehicle, which are the articles included in each of the plurality of orders, and a loadable weight of the unmanned aerial vehicle from the database before the delivery is started; a calculation unit configured to calculate a total weight of the plurality of articles by adding up the weights of the plurality of articles acquired by the acquisition unit; and a determination unit configured to determine, by comparing the loadable weight of the unmanned aerial vehicle with the total weight, whether or not the unmanned aerial vehicle is capable of loading and delivering the articles included in each of the plurality of orders.

Advantageous Effect of the Invention

According to one or more embodiments of the present invention, it is possible to efficiently determine whether or not loading and delivering the articles included in each of the plurality of orders on the unmanned aerial vehicle having a decided maximum loadable weight is possible.

BRIEF DESCRIPTION OF THE DRAWINGS

FIG. 12 is a conceptual diagram illustrating an example of a delivery order of each of a plurality of articles included in one order.

DESCRIPTION OF EMBODIMENTS

An embodiment of the present invention is described hereinafter with reference to the drawings.

[1. Configuration of Delivery System S]

Figure 1:
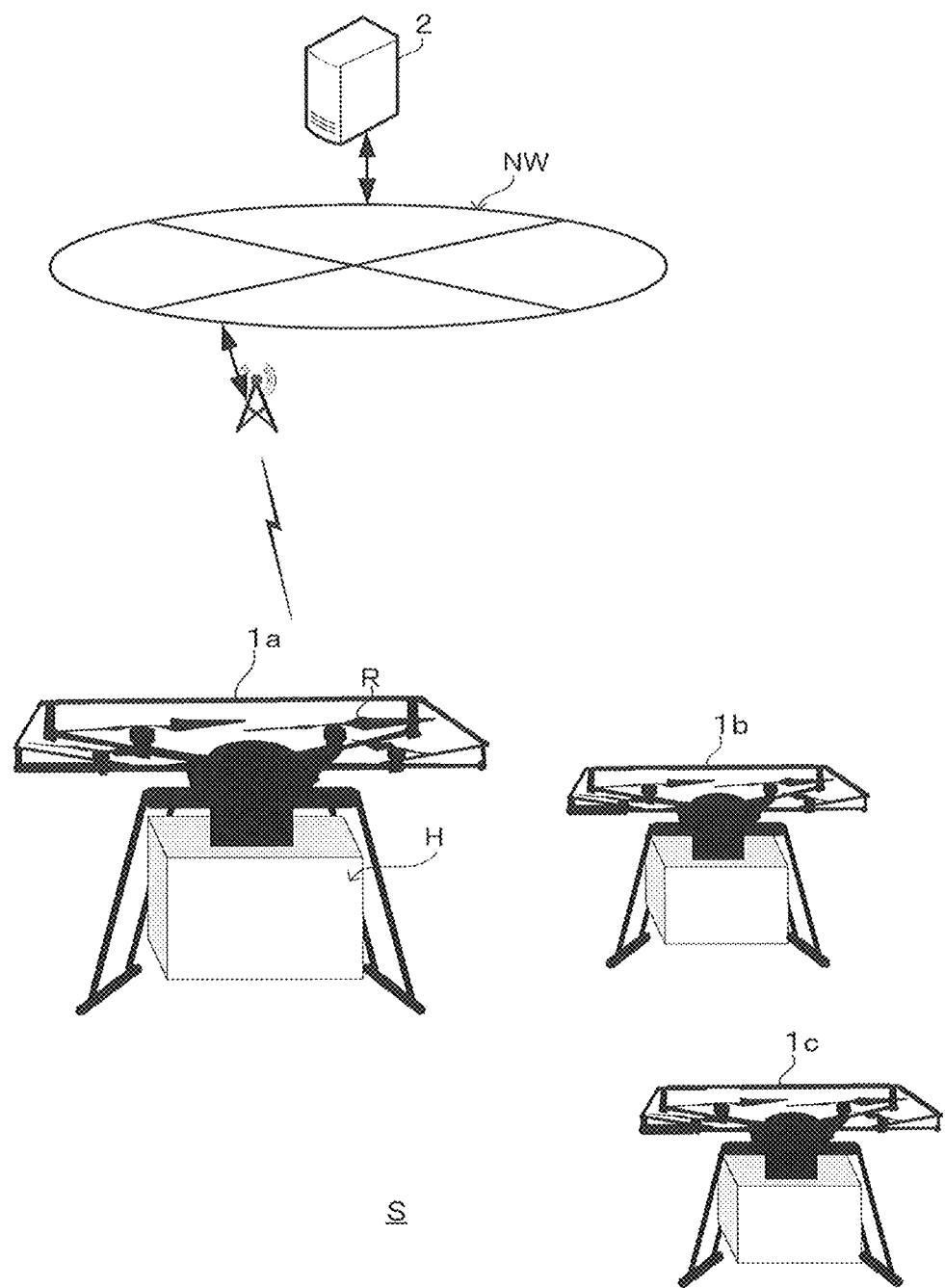
FIG. 1 is a diagram illustrating a schematic configuration example of a delivery system S.

First, the configuration of a delivery system S according to the present embodiment is described with reference to FIG. 1. FIG. 1 is a diagram illustrating a schematic configuration example of the delivery system S. As illustrated in FIG. 1, the delivery system S is configured to include UAVs (Unmanned Aerial Vehicles) 1a, 1b, 1c, and others, and a management server 2. Incidentally, in the following description, the UAVs 1a, 1b, 1c, and the others are collectively referred to as a UAV 1. The UAV 1 is an example of an unmanned flying body used for the delivery (transportation) of articles, and is also called a drone or a multicopter. The UAV 1 can fly according to remote control by an operator from the ground, or can fly autonomously.

The management server 2 is an example of an information processing device that executes a predetermined information processing using a database that stores information relating to the UAV 1 and information relating to orders of articles. Incidentally, the UAV 1 is managed by a GCS (Ground Control Station). The GCS may, for example, be installed on a control terminal operated by the operator as an application, or may be systematized by the management server 2 or another server other than the management server 2. Moreover, a communication network NW is configured to include, for example, internet, a mobile communication network, a radio base station thereof, and the like.

The articles loaded (mounted) on the UAV 1 as cargos are, for example, ordered articles (for example, products (items) or delivery articles) ordered on an EC (Electronic commerce) site or a delivery site, etc. Such articles are delivered from a delivery base to a delivery destination specified by an order by a person requesting a delivery (for example, a person ordering a product). The delivery destination is a place including in front of an entrance/exit of a residence where a recipient lives (in front of a front door) or in front of an entrance/exit of an office where the recipient works. Incidentally, in a case where it is difficult for the recipient to directly receive the article from the UAV 1 due to not being present at the delivery destination, etc., the UAV 1 may place the articles in a specific place (outdoors) at the delivery destination, then leave that place (this is referred to as an unattended delivery). In this case, the place where the articles are placed may be, for example, the ground (for example, ground made of concrete, soil, gravel, or turf) in front of the entrance/exit of the residence or the office.

The delivery base is a place where the articles are loaded on the UAV 1. In particular, the present embodiment is assumed to include a case in which the articles included in each of a plurality of orders (that is, mixed loading) are loaded on the UAV 1 and delivered (this is referred to as "mixed loading delivery"), and a case in which the plurality of articles included in one order are divided and delivered (this is referred to as "divided delivery") over a plurality of times. In the delivery system S according to the present embodiment, it is possible to realize a quick and efficient delivery on the basis of a loadable weight of the UAV 1 (also referred to as a vehicle payload) and a total weight of the plurality of articles loaded on the UAV 1.

[1-1. Configuration and Function of UAV 1]

Figure 2:
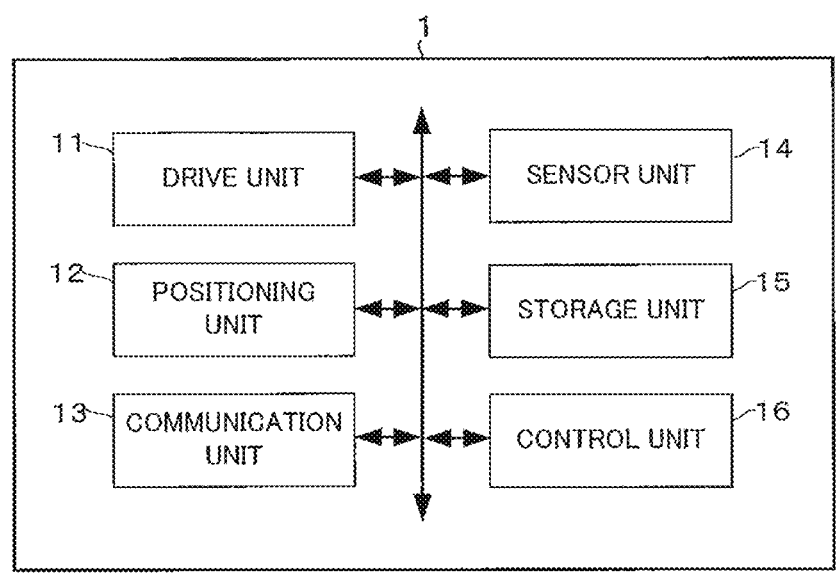
FIG. 2 is a diagram illustrating a schematic configuration example of an UAV 1.

Next, the configuration and function of the UAV 1 are described with reference to FIG. 2. FIG. 2 is a diagram illustrating a schematic configuration example of the UAV 1. As illustrated in FIG. 2, the UAV 1 includes a drive unit 11, a positioning unit 12, a communication unit 13, a sensor unit 14, a storage unit 15, a control unit 16, and the like. Further, the UAV 1 includes a battery (not illustrated) that supplies power to each unit of the UAV 1, a rotor R (propeller) which is a horizontal rotary wing, a loading unit H for loading the articles, and the like. The loading unit H can load the plurality of articles. The articles may be stored in a storage box then loaded on the loading unit H. A holding mechanism for holding (that is, connecting) the articles or the storage box thereof is provided inside the loading unit H. Incidentally, the loading unit H may be provided with a wire and a reel (winch) for feeding or winding the wire.

The drive unit 11 includes a motor, a rotating shaft, and the like. The drive unit 11 rotates a plurality of rotors by the motor, the rotating shaft, and the like that are driven according to a control signal output from the control unit 16. The positioning unit 12 includes a radio wave receiver, an altitude sensor, and the like. The positioning unit 12 receives, for example, a radio wave transmitted from a GNSS (Global Navigation Satellite System) satellite by the radio wave receiver and detects a current position (latitude and longitude) of the UAV 1 in a horizontal direction on the basis of the radio wave. Incidentally, the current position of the UAV 1 in the horizontal direction may be corrected based on images captured by a camera of the sensor unit 14. Position information indicating the current position detected by the positioning unit 12 is output to the control unit 16. Further, the positioning unit 12 may detect the current position (altitude) of the UAV 1 in a vertical direction by the altitude sensor, such as an atmospheric pressure sensor and the like. In this case, the position information includes the altitude information indicating the altitude of the UAV 1.

The communication unit 13 controls communication performed via the communication network NW. The sensor unit 14 includes various types of sensors necessary for controlling the flight of the UAV 1. The various types of sensors include, for example, an optical sensor, a triaxial angular velocity sensor, a triaxial acceleration sensor, a geomagnetic sensor, and the like. The optical sensor is configured by, for example, the camera. For example, the optical sensor continuously senses a real space (for example, image capturing) within a range that falls within an angle of view of the camera. Sensing information obtained by the sensing of the sensor unit 14 is output to the control unit 16. The storage unit 15 is configured from non-volatile memory and the like, and stores various types of programs and data. Moreover, the storage unit 15 stores a vehicle identifier (ID) of the UAV 1. The vehicle ID is identification information for identifying the UAV 1.

The control unit 16 includes a CPU (Central Processing Unit), a ROM (Read Only Memory), a RAM (Random Access Memory), and the like, and executes various types of controls according to programs stored in the ROM (or the storage unit 15). For example, the control unit 16 performs flight control that causes the UAV 1 to fly to the delivery destination specified by the order. In such flight control, a number of rotations of the rotor R, a position of the UAV 1, an attitude (stance) of the UAV 1, and a traveling direction of the UAV 1 are controlled using the position information acquired from the positioning unit 12, the sensing information acquired from the sensor unit 14, the delivery destination information, and the like. By this configuration, the UAV 1 can move autonomously to the delivery destination. Incidentally, during the flight of the UAV 1, the position information of the UAV 1 and the vehicle ID of the UAV 1 are sequentially transmitted to the management server 2 by the communication unit 13.

Here, the delivery destination information may, for example, be set in the UAV 1 together with an order ID at the delivery base, or may be transmitted from the management server 2 together with the order ID, then set. The order ID is identification information for identifying the order. An article ID may be used instead of the order ID for identifying the article. The delivery destination information includes, for example, a delivery destination ID of the delivery destination specified by the order and location information of the delivery destination. The delivery destination ID is identification information for identifying the delivery destination. The location information of the delivery destination may be an address of the delivery destination, or may be the position information (latitude and longitude) of the delivery destination. Incidentally, in a case where the articles are delivered to each of a plurality of delivery destinations in which the orders are different, the delivery destination information is set for each delivery destination.

Moreover, the control unit 16 performs a detachment control for detaching the articles loaded on the loading unit H from the UAV 1 when the UAV 1 is in a state of flying (flying state) or when the UAV 1 is in a state of landing (landed state). Here, "the UAV 1 is in a state of flying when the UAV 1" is in a state of moving (that is, moving in the horizontal direction, the vertical direction, or a diagonal direction) in the air, or when the UAV 1 is in a state of hovering (hovering state). The detachment control by the control unit 16 is performed, for example, by releasing (uncoupling) a hold of the article or the storage box thereof from the holding mechanism and opening a door provided on a side surface or a lower surface of the loading unit H. In a case where the detachment control is performed when the UAV 1 is in the state of flying, the article or the storage box thereof is dropped to the ground from the sky of the delivery destination. Alternatively, the loading unit H may be lowered in the direction of the ground by feeding the wire using the reel of the UAV 1 hovering over the delivery destination.

[1-2. Configuration and Function of Management Server 2]

Figure 3:
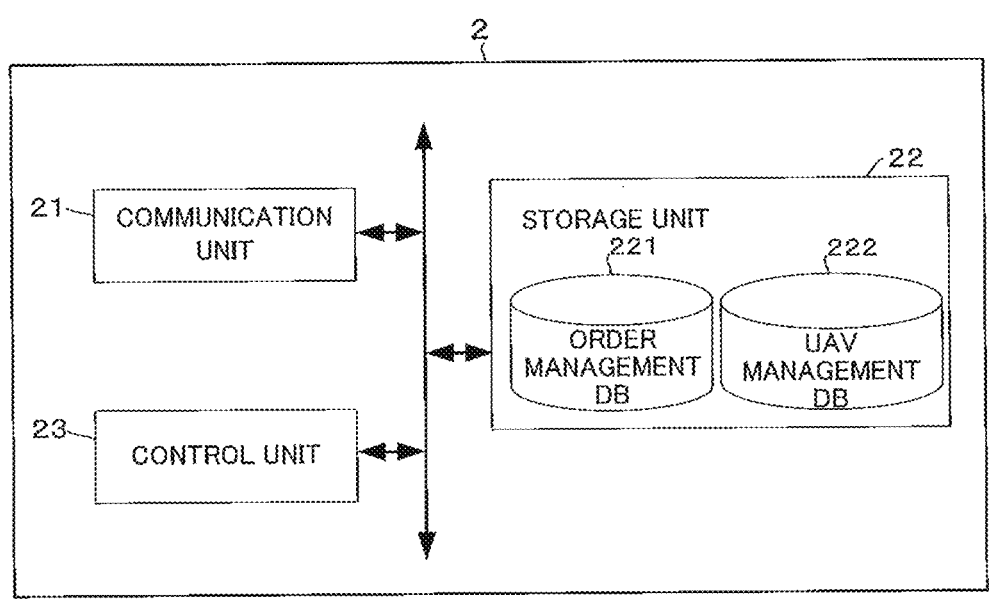
FIG. 3 is a diagram illustrating a schematic configuration example of a management server 2.

Next, the configuration and function of the management server 2 are described with reference to FIG. 3. FIG. 3 is a diagram illustrating a schematic configuration example of the management server 2. As illustrated in FIG. 3, the management server 2 includes a communication unit 21, a storage unit 22, a control unit 23, and the like. The communication unit 21 controls communication performed via the communication network NW. The position information and the vehicle ID transmitted from the UAV 1 are received by the communication unit 21. The management server 2 can recognize the current position of the UAV 1 by the position information of the UAV 1. The storage unit 22 is configured from, for example, a hard disk drive and the like, and stores various types of programs and data. Moreover, the storage unit 22 is built using an order management database (DB) 221, a UAV management database 222, and the like. Incidentally, the order management database 221 and the UAV management database 222 may be configured using one database. Moreover, these databases may be built in a database server other than the management server 2.

The order management database 221 is a database for managing information relating to orders of articles. The order management database 221 stores (registers) the article ID of one or more articles included in the order, order information, the delivery destination information indicating the delivery destination specified by the order, a weight of one or more articles, a name (for example, product name) of one or more articles, a size of one or more articles, quantity of one or more articles, an attribute of one or more articles, article recipient information, the vehicle ID of the UAV 1 that delivers one or more articles, and the like in association with each order. Here, the order information includes the order ID, user information of the person requesting the ordered delivery, an order date and time, a specified delivery time (for example, a time slot of 13:00 to 15:00), payment information, and the like. The specified delivery time is specified by the person requesting the delivery, or set automatically by the management server 2. The weight of one or more articles may be a weight per article, or it may be a weight of all the articles. The size of one or more articles is indicated by, for example, width (cm)×depth (cm)×height (cm), and may be a size of the storage box in which the article is stored.

The attribute of one or more articles is, for example, at least one out of whether or not an article is resistant to sunlight, whether or not an article is resistant to heat (for example, a temperature equal to or higher than a threshold value), whether or not an article is resistant to humidity (for example, a humidity level equal to or higher than a threshold value), whether or not an article is resistant to wetness (for example, rain or snow), whether or not an article is resistant to static electricity (for example, lightning), whether or not an article is resistant to impact, whether or not an article is breakable, whether or not an article is fresh food, whether or not an article is perishable food, whether or not an article is frozen food that melts over a period of time, etc. "Whether or not an article is resistant to . . . " can be reworded to be "whether or not an article is impacted by . . . ". Incidentally, the attribute of the article may be a category of the article. In this case, the articles are roughly divided into the categories of food, beverage, clothing, medical products, daily necessities, tableware, electronic devices, books, and the like. Further, the food may be classified as frozen food (for example, ice cream), chilled food (for example, fresh food), processed food, or deli items, etc.

The UAV management database 222 is a database for managing information relating to the UAV 1. The UAV management database 222 stores (registers) the vehicle ID of the UAV 1, the loadable weight of the UAV 1, a loadable capacity of the UAV 1, a cruisable distance of the UAV 1, an article detachment method of the UAV 1, and a delivery schedule assigned to the UAV 1 in association with each UAV 1. The loadable weight of the UAV 1 is the maximum loadable weight on the loading unit H of the UAV 1. The loadable capacity of the UAV 1 is the maximum capacity (that is, the maximum storable capacity of the articles) that is loadable on the loading unit H of the UAV 1. The cruisable distance of the UAV 1 is a distance over which the UAV 1 is capable of continuing flight without charging, and is calculated in advance on the basis of a capacity of the battery provided in the UAV 1 and a weight of the UAV 1. Incidentally, a relationship between the cruisable distance and a load weight of the UAV 1 may be stored in the UAV management database 222 instead of the cruisable distance of the UAV 1. The relationship between the cruisable distance and the load weight may be defined by an arithmetic expression f(x), or may be prescribed by a table. This relationship is based on a reduction of the cruisable distance of the UAV 1 due to an increase in an amount consumed by the battery when the load weight on the UAV 1 increases.

The article detachment method indicates at least one out of article detachment executable in the flying state of the UAV 1 and article detachment in the landed state of the UAV 1. Further, the article detachment executable in the flying state of the UAV 1 may indicate at least one out of dropping from the sky and lowering using the reel. The delivery schedule of the UAV 1 includes, for example, a delivery time slot and a delivery area in which flight is permitted by a flight management system. The delivery time slot may be divided into a plurality of time slots throughout a day, such as, for example, 10:00 to 12:00, 12:00 to 14:00, 14:00 to 16:00, and 16:00. to 18:00. One delivery time slot may be represented by year, month, date, and time, such as, for example, 2021/6/1 10:00 to 12:00. The delivery area is divided into a plurality of zones, such as, for example, zone A, zone B, and zone C. One delivery area may have various large and small areas (sizes).

Moreover, the storage unit 22 stores weather conditions map data showing weather conditions (in other words, the environment) in the delivery area and the delivery time slot for which a flight by the UAV 1 is scheduled. The weather conditions map data (weather prediction map data) is a map indicating at least one of temperature information, humidity information, wind (wind speed and wind direction) information, and climate (clear, rain, snow, lightning) information of the delivery area and the delivery time slot, and may be, for example, a map for each predetermined unit time from the present to a future predetermined point of time. Incidentally, the weather conditions map data can be acquired from a weather observation server or a weather prediction server, etc.

Figure 4:
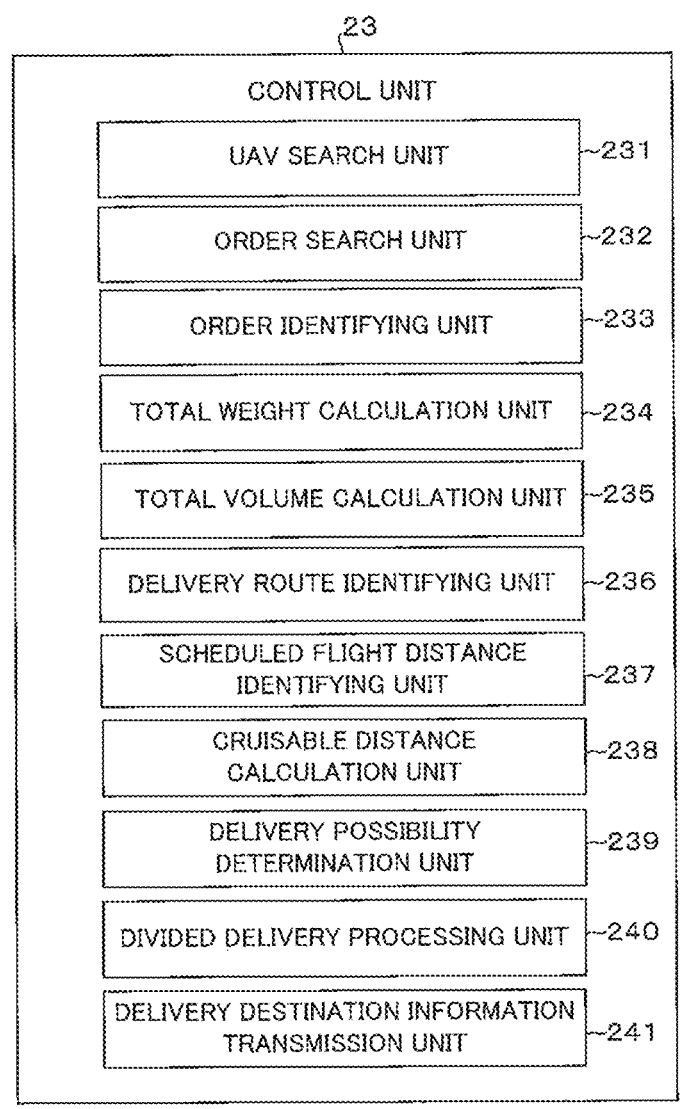
FIG. 4 is a diagram illustrating an example of functional blocks in a control unit 23.

The control unit 23 includes a CPU, a ROM, a RAM, and the like, and executes various types of processes according to the programs stored in the ROM or the storage unit 22. FIG. 4 is a diagram illustrating an example of functional blocks in the control unit 23. As illustrated in FIG. 4, by executing the programs, the control unit 23 functions as a UAV search unit 231 (an example of an acquisition unit), an order search unit 232 (an example of an acquisition unit), an order identifying unit 233 (an example of a third identifying means, a fourth identifying means, a fifth identifying means, and a sixth identifying means), a total weight calculation unit 234 (an example of a first calculation means and a calculation unit), a total volume calculation unit 235 (an example of a third calculation means), a delivery route identifying unit 236 (an example of a first identifying means), a scheduled flight distance identifying unit 237 (an example of a second identifying means), a cruisable distance calculation unit 238 (an example of a second calculation means), a delivery possibility determination unit 239 (an example of a determination means and a determination unit), a divided delivery processing unit 240 (an example of a decision means), a delivery destination information transmission unit 241 (an example of a transmission means), and the like.

The UAV search unit 231 refers to the UAV management database 222 and searches for UAVs 1 capable of flying under a newly decided delivery schedule (including the delivery area and the delivery time slot). That is, a UAV 1 not yet having an allocated delivery schedule or a UAV 1 having an allocated delivery schedule that does not overlap with the newly decided delivery schedule is searched from among the UAVs 1 (UAVs 1a, 1b, 1c, and the others) managed by the UAV management database 222. At this time, UAVs 1 having a cruisable distance appropriate for a range (extent) of the delivery area included in the delivery schedule may be searched. The UAV 1 used for an article delivery is identified from among the UAVs 1 searched by the UAV search unit 231.

The order search unit 232 refers to the order management database 221 and searches for unprocessed orders. The order identifying unit 233 identifies orders including one or more articles loaded on the UAV 1 from among one or more of orders showing up as a hit by the search. For example, the order identifying unit 233 identifies a plurality of orders having delivery destinations that are included in the delivery area (that is, the delivery area included in the delivery schedule) for which the flight by the UAV 1 is scheduled. Accordingly, since it is possible to limit the orders subject to delivery, a more efficient article delivery can be realized. Here, the order identifying unit 233 may identify a plurality of orders having the specified delivery time that is included in the delivery time slot (that is, the delivery time slot included in the delivery schedule) for which the flight by the UAV 1 is scheduled. That is, in this case, the order identifying unit 233 may identify a plurality of orders having delivery destinations that are included in the delivery area for which the flight by the UAV 1 is scheduled, and further, having a specified delivery time that is included in the delivery time slot for which the flight by the UAV 1 is scheduled.

Moreover, the order identifying unit 233 may identify a plurality of orders including articles not impacted by weather conditions in the delivery area and the delivery time slot on the basis of the attributes of the articles included in each of the plurality of orders and the weather conditions in the delivery area and the delivery time slot for which the flight by the UAV 1 is scheduled. Accordingly, a reduction in quality of the articles delivered to the delivery destinations due to the impact of the weather conditions in the delivery area and the delivery time slot can be prevented as much as possible. Here, in a case where the plurality of articles is included in one order, all these articles may be required to be articles that are not impacted by weather conditions. For example, in a case where the climate of the delivery area and the delivery time slot is indicated to be rainy, orders including articles resistant to wetness are identified on the basis of the attributes of the articles included in the order. Moreover, in a case where the climate of the delivery area and the delivery time slot is indicated to be clear, a plurality of orders including articles resistant to sunlight or articles resistant to heat is identified on the basis of the attributes of the articles included in the order. Incidentally, the weather conditions in the delivery area and the delivery time slot for which the flight is scheduled may be identified from the weather prediction map data.

Moreover, the order identifying unit 233 may identify a plurality of orders including articles not impacted by the article detachment method of the UAV 1 on the basis of the attributes of the articles included in the orders and the article detachment method of the UAV 1. Accordingly, a reduction in quality of the articles delivered to the delivery destinations due to the impact of the article detachment method of the UAV 1 can be prevented as much as possible. Here, in a case where the plurality of articles is included in one order, all these articles may be required to be articles that are not impacted by the article detachment method of the UAV 1. For example, in a case where the article detachment method of the UAV 1 indicates dropping from the sky, a plurality of orders including articles resistant to impact or articles that are not breakable is identified on the basis of the attributes of the articles included in the orders. Incidentally, even in a case where lowering using the reel is indicated for the article detachment method of the UAV 1, when the weather conditions in the delivery area and the delivery time slot for which the flight is scheduled are indicated to be strong winds, a plurality of orders including articles resistant to impact or articles that are not breakable may be identified on the basis of the attributes of the articles included in the orders.

The total weight calculation unit 234 calculates a total weight of the plurality of articles loaded on the UAV 1 on the basis of the weight of the articles included in each of the plurality of orders identified by the order identifying unit 233. That is, the total weight is calculated by adding up each of the weights of the plurality of articles. The total volume calculation unit 235 calculates a total volume of the plurality of articles loaded on the UAV 1 on the basis of volumes of the articles included in each of the plurality of orders identified by the order identifying unit 233. The volume of the article can be obtained from the size of the article. Incidentally, the volume of the article may be a volume of the storage box in which the article is stored.

The delivery route identifying unit 236 identifies a delivery route for delivering the articles included in each order on the basis of the delivery destinations specified by each order identified by the order identifying unit 233. That is, the delivery route along which the UAV 1 returns from the delivery base (delivery start point) via each delivery destination is identified on the basis of the position information of the delivery destinations. Here, for example, the delivery route identifying unit 236 may determine a delivery route along which the UAV 1 is caused to fly from the delivery base to the delivery destinations in a delivery order of earliest specified delivery time (that is, the closest specified delivery time from a current point in time). The scheduled flight distance identifying unit 237 identifies a scheduled flight distance of the UAV 1 on the basis of the delivery route identified by the delivery route identifying unit 236. That is, the scheduled flight distance when the UAV 1 will fly along the delivery route is identified.

The cruisable distance calculation unit 238 calculates a cruisable distance of the UAV 1 on the basis of the weights of the articles included in each order identified by the order identifying unit 233 and the relationship between the cruisable distance and the load weight of the UAV 1. For example, the total weight calculated by the total weight calculation unit 234 is input as a function x in an arithmetic expression f(x) that defines the relationship between the cruisable distance of the UAV 1 and the load weight to calculate the cruisable distance of the UAV 1. Incidentally, the cruisable distance calculation unit 238 may calculate the cruisable distance such that the distance increases according to the weight being reduced due to the articles included in some orders among the plurality of orders, identified by the order identifying unit 233, being detached from the UAV 1 at the delivery destination. Accordingly, since a cruisable distance is used in which the reducing weight at each delivery destination has been considered, a more efficient article delivery can be realized.

The delivery possibility determination unit 239 determines whether or not the UAV 1 is capable of loading and delivering the articles included in each of the plurality of orders by comparing the loadable weight of the UAV 1 with the total weight calculated by the total weight calculation unit 234. For example, in a case where the total weight of the plurality of articles loaded on the UAV 1 is equal to or less than the loadable weight, it is determined that the UAV 1 is capable of loading and delivering the articles included in each of the plurality of orders. Moreover, the delivery possibility determination unit 239 may determine whether or not the UAV 1 is capable of loading and delivering the articles included in each of the plurality of orders by comparing the loadable capacity of the UAV 1 with the total volume calculated by the total volume calculation unit 235. This makes it possible to efficiently determine whether or not loading and delivering the articles included in each of the plurality of orders on the UAV 1 having a decided (preset) maximum storable capacity is possible. For example, in a case where the total volume of the plurality of articles loaded on the UAV 1 is equal to or less than the loadable capacity, it is determined that the UAV 1 is capable of loading and delivering the articles included in each of the plurality of orders.

Moreover, the delivery possibility determination unit 239 may determine that the UAV 1 is capable of loading and delivering the articles included in each of the plurality of orders by comparing the scheduled flight distance identified by the scheduled flight distance identifying unit 237 with the cruisable distance calculated by the cruisable distance calculation unit 238. This makes it possible to efficiently determine whether or not loading and delivering the articles included in each of the plurality of orders on the UAV 1 having a limited cruisable distance is possible. For example, in a case where the scheduled flight distance identified by the scheduled flight distance identifying unit 237 is equal to or less than the cruisable distance, it is determined that the UAV 1 is capable of loading and delivering the articles included in each of the plurality of orders. Incidentally, a cruisable distance (predetermined cruisable distance) stored in the UAV management database 222 may be used instead of the cruisable distance calculated by the cruisable distance calculation unit 238.

In a case where the delivery possibility determination unit 239 determines that the delivery is not possible, and further, the plurality of articles is included in any one order from among the plurality of orders, the total weight calculation unit 234 calculates the total weight of the articles loaded on the UAV 1 on the basis of the weight of the plurality of articles included in any one order from among the plurality of orders identified by the order identifying unit 233. In this case, the delivery possibility determination unit 239 further compares the loadable weight of the UAV 1 with the total weight (that is, the total weight of the plurality of articles included in the one order) calculated by the total weight calculation unit 234 to determine whether or not the UAV 1 is capable of loading and delivering the articles included in the one order. This makes it possible to efficiently determine whether or not loading and delivering the articles included in the one order on the UAV 1 having a decided (preset) maximum loadable weight is possible.

Incidentally, the total volume calculation unit 235 may calculate the total volume of the articles loaded on the UAV 1 on the basis of the volumes of the plurality of articles included in any one order from among the plurality of orders identified by the order identifying unit 233. In this case, the delivery possibility determination unit 239 may further compare the loadable capacity of the UAV 1 with the total volume (that is, the total volume of the plurality of articles included in the one order) calculated by the total volume calculation unit 235 to determine whether or not the UAV 1 is capable of loading and delivering the articles included in the one order.

In a case where it is determined that loading and delivering the plurality of articles included in the one order is not possible, the divided delivery processing unit 240 decides (determines) to divide the plurality of articles included in the one order and deliver to the delivery destination over a plurality of times. Accordingly, even in a case where it is difficult to load and deliver the plurality of articles included in the one order on the UAV 1, the plurality of articles can be divided and delivered over a plurality of times. Also, the divided delivery processing unit 240 decides a delivery order for each of the plurality of articles on the basis of the respective attributes of the plurality of articles included in the one order. Accordingly, a reduction in quality of the articles delivered to the delivery destination can be prevented as much as possible.

Here, the delivery order is the order (ranking) in which the articles are delivered to and arrive at the delivery destination, and is also referred to as a delivery priority level. The delivery order may be represented as "leading," "following," or may be represented as "first" (first arrival), "second" (second arrival), "third" (third arrival), etc. For example, from among the plurality of articles, the delivery order of processed products is decided to be "leading" (that is, a decision to deliver first), and the delivery order of chilled food or frozen food is decided to be "following" (that is, a decision to deliver after). This is because in a case where chilled food or frozen food is delivered first and safe dropped at the delivery destination, the quality of the chilled food or the frozen food may be reduced.

Incidentally, the divided delivery may be performed by one UAV 1 or may be performed by a plurality of UAVs 1. In the former case, for example, after the UAV 1a delivers the "leading" articles to the delivery destination first then returns to the delivery base, the UAV 1a then delivers the "following" articles to the delivery destination afterward. In the latter case, the UAV 1a, which flies first, delivers the "leading" articles to the delivery destination first, and before the UAV 1a returns, the UAV 1b, which flies after, delivers the "following" articles to the delivery destination afterward.

Further, the divided delivery processing unit 240 may decide (determine) the delivery order of each of the plurality of articles included in the one order on the basis of the weather conditions in the delivery area and the delivery time slot for which the flight by the UAV 1 is scheduled and the respective attributes of the plurality of articles included in the one order. Accordingly, a reduction in quality of the articles delivered to the delivery destination due to the impact of the weather conditions in the delivery area and the delivery time slot can be prevented as much as possible. For example, in a case where the climate of the delivery area and the delivery time slot is clear, the delivery order of articles resistant to sunlight from among the plurality of articles is decided to be "leading". Moreover, in a case where the climate of the delivery area and the delivery time slot is rainy, the delivery order of articles not resistant to wetness from among the plurality of articles is decided to be "following". Moreover, in a case where a temperature of the delivery area and the delivery time slot is 30° C. or higher and a humidity level is 80% or higher, the delivery order of perishable articles (for example, foods in which a propagation of bacteria increases, such as deli items, etc.) from among the plurality of articles is decided to be "following".

The delivery destination information transmission unit 241 transmits the delivery destination information indicating the delivery destination specified by the orders determined to be deliverable by the delivery possibility determination unit 239 to the UAV 1 via the communication network NW. In particular, the delivery destination information transmission unit 241 transmits the respective order IDs of each order and the delivery destination information indicating the delivery destinations specified by each order to the UAV 1 via the communication network NW according to that it is determined that the UAV 1 is capable of loading and delivering the articles included in each of the plurality of orders. This makes it possible to quickly set the delivery destination information indicating the delivery destinations specified by each of the plurality of orders in the UAV 1 according to a determination that the articles included in each of the plurality of orders are capable of being loaded and delivered.

[2. Operation of Delivery System S]

Figure 5:
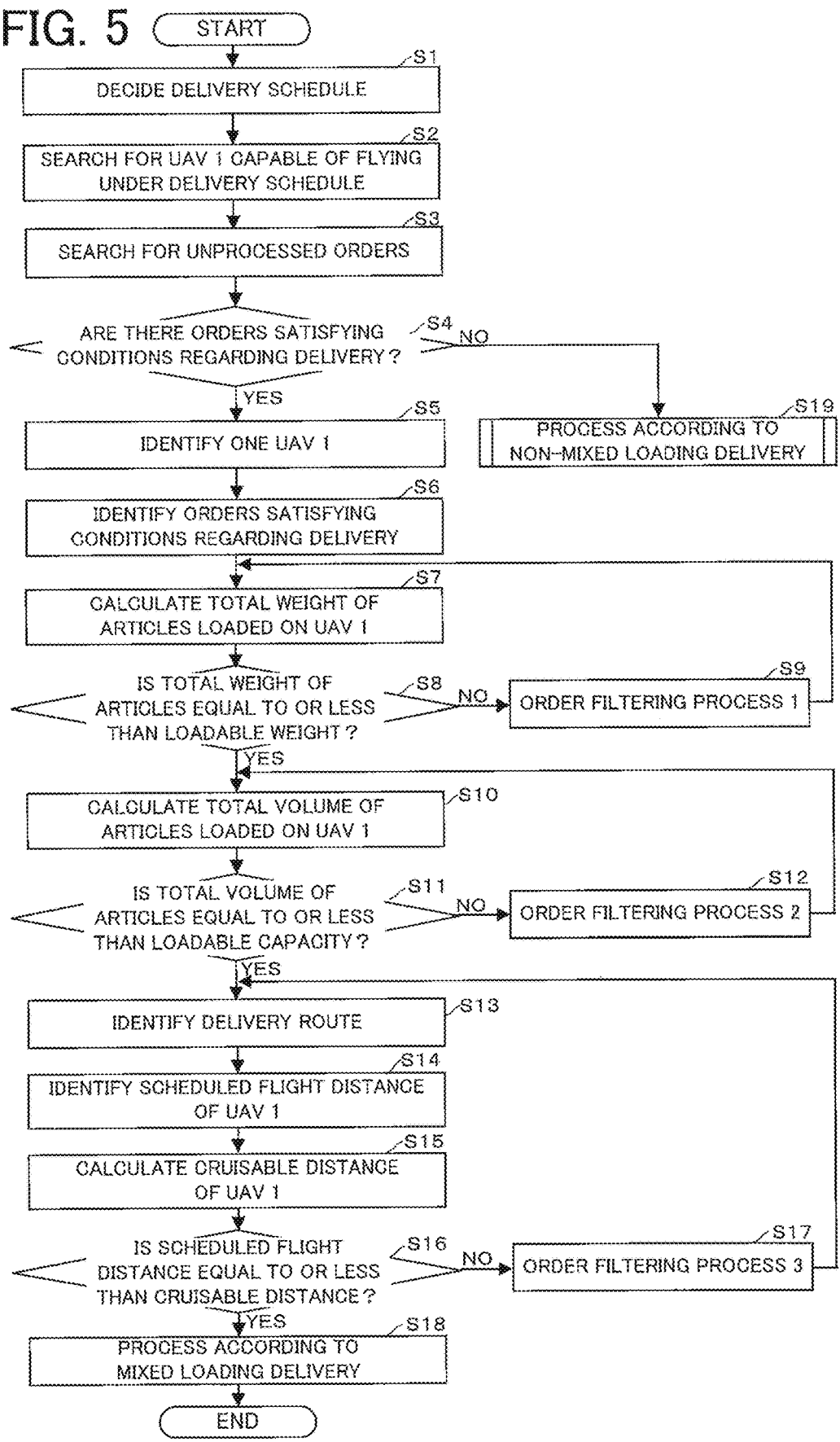
FIG. 5 is a flowchart illustrating an example of a mixed loading delivery possibility decision process executed by the control unit 23 of the management server 2.
Figure 6:
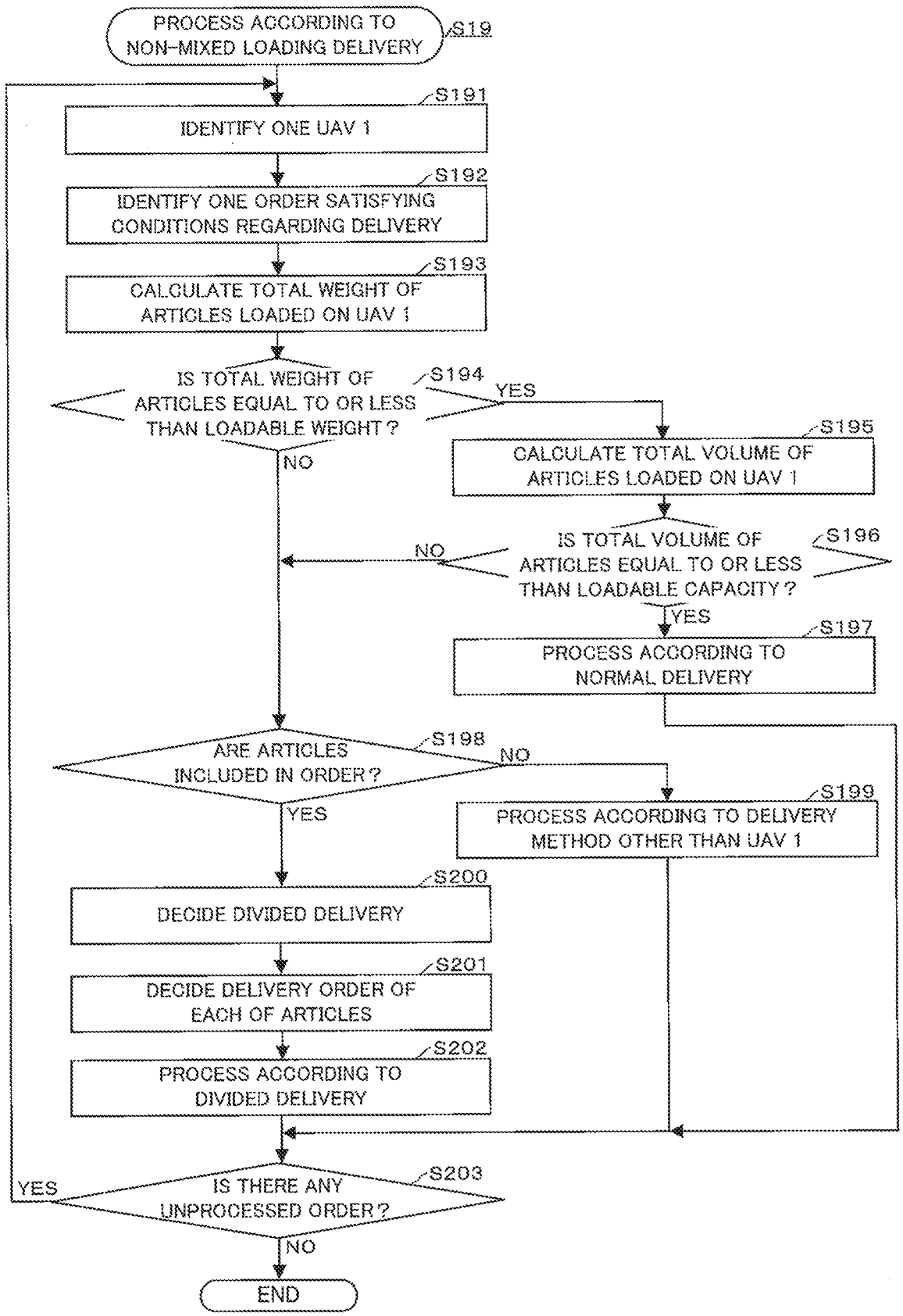
FIG. 6 is a flowchart illustrating an example of a process according to a non-mixed loading delivery in step S19 illustrated in FIG. 5.

Next, the operation of the delivery system S according to the present embodiment is described with reference to FIG. 5, FIG. 6, and the like. FIG. 5 is a flowchart illustrating an example of a mixed loading delivery possibility decision process executed by the control unit 23 of the management server 2. FIG. 6 is a flowchart illustrating an example of a process according to a non-mixed loading delivery in step S19 illustrated in FIG. 5. The process illustrated in FIG. 5 is executed regularly or irregularly, and is executed before the delivery of the ordered articles is started.

When the process illustrated in FIG. 5 is started, the control unit 23 decides, for example, a delivery schedule including a delivery time slot and the delivery area for which a flight is permitted by the flight management system (step S1). Next, the control unit 23 (UAV search unit 231) refers to the UAV management database 222 and searches for UAVs 1 capable of flying under the delivery schedule decided in step S1 (step S2). Information regarding the UAVs 1 showing up as a hit by the search (for example, the loadable weight, the loadable capacity, the cruisable distance, and the like. of the UAV 1) is acquired from the UAV management database 222 by the control unit 23 (UAV search unit 231) and used in subsequent processes. Incidentally, in a case where no UAVs 1 show up as a hit by the search, the process illustrated in FIG. 5 ends.

Next, the control unit 23 (the order search unit 232) refers to the order management database 221 and searches for unprocessed orders (step S3). Information regarding the orders showing up as a hit by the search (for example, the delivery destination information, and the weights, the sizes, the attributes of the articles, and the like) is acquired from the order management database 221 by the control unit 23 (order search unit 232) and used in subsequent processes. Incidentally, in a case where no orders show up as a hit by the search, the process illustrated in FIG. 5 ends.

Next, the control unit 23 determines whether or not there is a plurality of orders satisfying conditions regarding delivery from among the orders showing up as a hit by the search of step S3 (step S4). Here, an order satisfying the conditions regarding delivery is an order having a delivery destination that is included in the delivery area of the delivery schedule decided in step S1, and further having a specified delivery time that is included in the delivery time slot of the delivery schedule. Alternatively, an order satisfying the conditions regarding delivery may be an order having a delivery destination that is included in the delivery area of the delivery schedule, or an order having a specified delivery time that is included in the delivery time slot of the delivery schedule.

In a case where it is determined in step S4 that there is a plurality of orders satisfying the conditions regarding delivery (step S4: YES), the process proceeds to step S5. On the other hand, in a case where it is determined that there is not a plurality of orders satisfying the conditions regarding delivery (there is one order) (step S4: NO), the process moves to the process according to the non-mixed loading delivery (step S19). Incidentally, in a case where there are no orders at all satisfying the conditions regarding delivery, the process illustrated in FIG. 5 ends.

Figure 7:
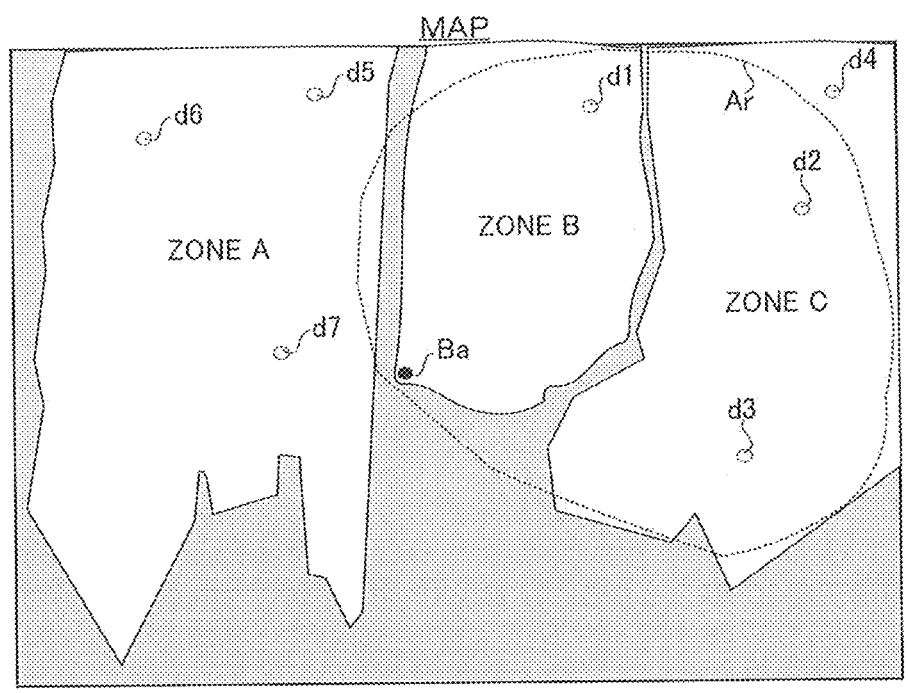
FIG. 7 is a diagram showing a delivery area and positions of delivery destinations specified by orders on a map.
Figure 8:
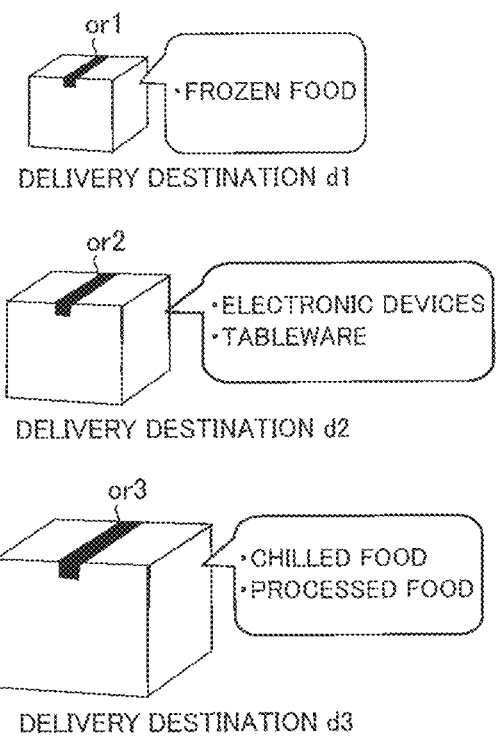
FIG. 8 is a diagram illustrating an example of articles included in orders or1 to or3 corresponding to each of the delivery destinations d1 to d3.

FIG. 7 is a diagram showing a delivery area and positions of delivery destinations specified by orders on a map. In the example of FIG. 7, a delivery base (delivery start point) Ba of a UAV 1 and positions of seven delivery destinations d1 to d7 are illustrated on the map, and the delivery destinations d1 to d3 from among the delivery destinations d1 to d7 are included in the delivery area Ar. FIG. 8 is a diagram illustrating an example of articles included in orders or1 to or3 corresponding to each of the delivery destinations d1 to d3. In the example of FIG. 8, the order on includes frozen food (for example, ice cream), the order or2 includes electronic devices and tableware, and the order or3 includes chilled food and processed food.

In step S5, the control unit 23 identifies one UAV 1 to be used for the article delivery from among the UAVs 1 showing up as a hit by the search of step S2. Next, the control unit 23 (order identifying unit 233) identifies the plurality of orders satisfying the conditions regarding delivery (step S6). For example, the orders corresponding to each of the delivery destinations d1 to d3 illustrated in FIG. 7 are identified as the orders satisfying the conditions regarding delivery. In this way, a plurality of orders matching as a subject of the mixed loading delivery is identified.

Incidentally, in step S6, the control unit 23 may identify the plurality of orders including the articles not impacted by the weather conditions in the delivery area and the delivery time slot on the basis of the attributes of the articles included in each of the orders from among the plurality of orders satisfying the conditions regarding delivery and the weather conditions in the delivery area and the delivery time slot. For example, in a case where the climate of the delivery area and the delivery time slot is indicated to be clear, in the example of FIG. 8, the order or1 including frozen food susceptible to the impact of clear weather is excluded, and the orders or2 and or3 are identified. In a case where there is only one order including articles not impacted by weather conditions, the process moves to the process according to the non-mixed loading delivery illustrated in step S19. On the other hand, in a case where there are no orders at all including articles not impacted by weather conditions, the process illustrated in FIG. 5 ends.

Alternatively, in step S6, the control unit 23 may identify the plurality of orders including the articles not impacted by the article detachment method of the UAV 1 on the basis of the attributes of the articles included in each of the orders from among the plurality of orders satisfying the conditions regarding delivery and the article detachment method of the UAV 1 identified in step S5. For example, in a case where the article detachment method of the UAV 1 identified in step S5 indicates only dropping from the sky, in the example of FIG. 8, the order or2 including tableware susceptible to the impact of dropping from the sky is excluded, and the orders or1 and or3 are identified. In a case where there is only one order including articles not impacted by the article detachment method of the UAV 1, the process moves to the process according to the non-mixed loading delivery illustrated in step S19. On the other hand, in a case where there are no orders at all including articles not impacted by the article detachment method of the UAV 1, the process illustrated in FIG. 5 ends.

Next, the control unit 23 (total weight calculation unit 234) calculates the total weight of the plurality of articles loaded on the UAV 1 identified in step S5 on the basis of the weights of the articles included in each of the plurality of orders identified in step S6 (step S7). Next, the control unit 23 (delivery possibility determination unit 239) compares the loadable weight of the UAV 1 identified in step S5 with the total weight calculated in step S7 and determines whether or not the total weight of the articles is equal to or less than the loadable weight of the UAV 1 (step S8). By this configuration, it can be determined whether or not the UAV 1 is capable of loading and delivering the articles included in each of the plurality of orders.

Figure 9:
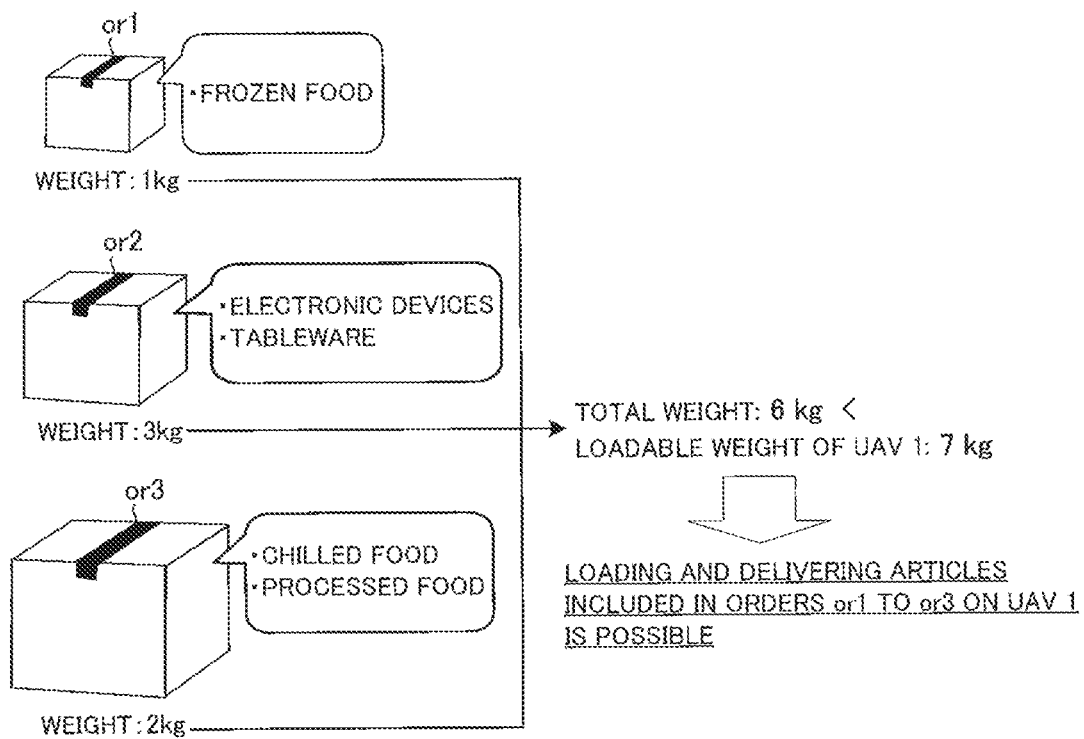
FIG. 9 is a diagram illustrating a comparative example of a total weight of articles and a loadable weight of the UAV 1.

In a case where it is determined in step S8 that the total weight of the articles is not equal to or less than the loadable weight of the UAV 1 (step S8: NO), it is determined that loading and delivering the articles is not possible, and the process proceeds to step S9. On the other hand, in a case where it is determined that the total weight of the articles is equal to or less than the loadable weight of the UAV 1 (step S8: YES), it is determined that loading and delivering the articles is possible (a temporary provisional determination at this point in time), and the process proceeds to step S10. FIG. 9 is a diagram illustrating a comparative example of the total weight of the articles and the loadable weight of the UAV 1. In the examples of FIG. 9, since the total weight of the articles included in the orders or1 to or3 is 6 kg and the loadable weight of the UAV 1 is 7 kg, it is provisionally determined that the UAV 1 is capable of loading and delivering the articles included in the orders or1 to or3 (that is, the mixed loading delivery is possible).

In step S9, the control unit 23 executes an order filtering process 1. In the order filtering process 1, the control unit 23 identifies a plurality of orders by excluding any one order from among the plurality of orders identified in step S6 (that is, the orders are filtered). For example, an order including an article having the largest weight from among the plurality of orders may be excluded. By this configuration, after the plurality of orders is once again identified (for example, two orders are identified by subtracting one from three orders), the process returns to step S7, and the processes from step S7 are performed for the plurality of orders identified. Incidentally, in the loop including step S9, in a case where one order remains as a result of some orders being excluded, the process moves to the process according to the non-mixed loading delivery indicated in step S19.

In step S10, the control unit 23 (total volume calculation unit 235) calculates the total volume of the plurality of articles loaded on the UAV 1 identified in step S5 on the basis of the volumes of the articles included in each of the plurality of orders identified in step S6 and the like. (that is, the orders that have cleared the determination of step S8). Next, the control unit 23 (delivery possibility determination unit 239) compares the loadable capacity of the UAV 1 identified in step S5 with the total volume calculated in step S10 and determines whether or not the total volume of the articles is equal to or less than the loadable capacity of the UAV 1 (step S11). By this configuration, it can be determined whether or not the UAV 1 is capable of loading and delivering the articles included in each of the plurality of orders.

Figure 10:
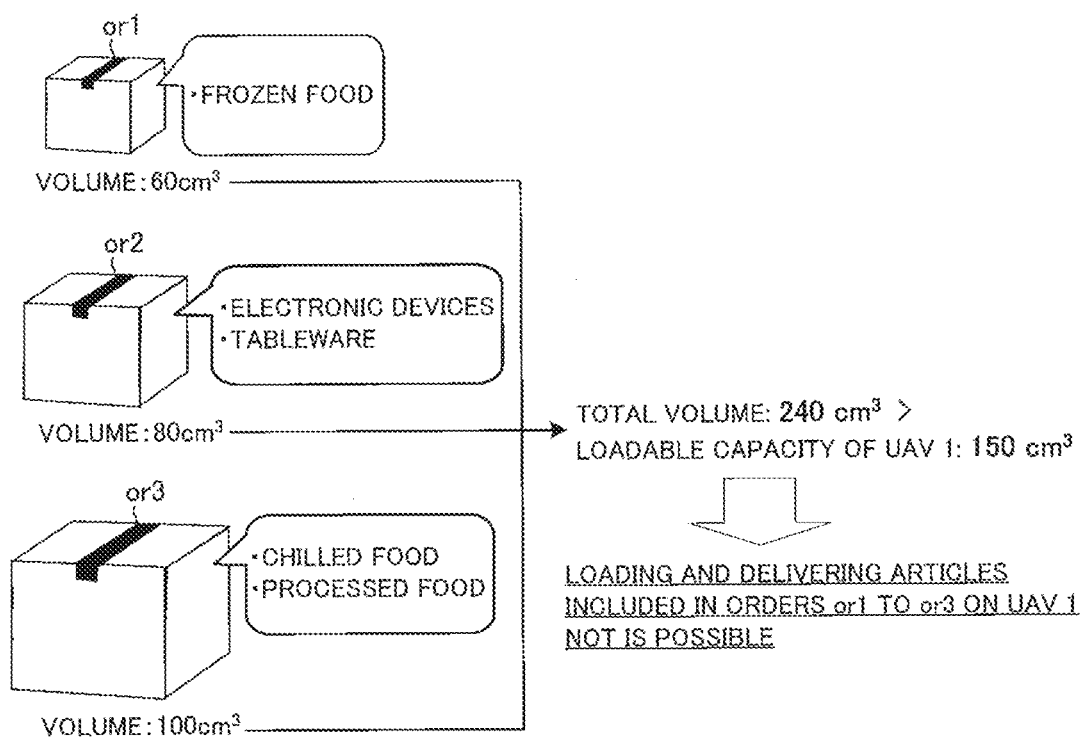
FIG. 10 is a diagram illustrating a comparative example of a total volume of articles and a loadable capacity of the UAV 1.

In a case where it is determined in step S11 that the total volume of the articles is not equal to or less than the loadable capacity of the UAV 1 (step S11: NO), it is determined that loading and delivering the articles is not possible, and the process proceeds to step S12. On the other hand, in a case where it is determined that the total volume of the articles is equal to or less than the loadable capacity of the UAV 1 (step S11: YES), it is determined that loading and delivering the articles is possible (a temporary provisional determination even at this point in time), and the process proceeds to step S13. FIG. 10 is a diagram illustrating a comparative example of a total volume of articles and a loadable capacity of a UAV 1. In the example of FIG. 10, since the total volume of the articles included in the orders on to or3 is 240 cm 3 and the loadable weight of the UAV 1 is 150 cm 3, it is provisionally determined that loading and delivering the articles included in the orders or1 to or3 is not possible.

In step S12, the control unit 23 executes an order filtering process 2. In the order filtering process 2, the control unit 23 identifies a plurality of orders by excluding any one order from among the plurality of orders identified in step S6 and the like. For example, an order including an article having the largest volume from among the plurality of orders (in the example of FIG. 10, the order or3) may be excluded. By this configuration, after the plurality of orders is identified again, the process returns to step S10, and the processes from step S10 are performed for the plurality of orders identified. Incidentally, in the loop including step S12, in a case where one order remains as a result of some orders being excluded, the process moves to the process according to the non-mixed loading delivery indicated in step S19.

Figure 11:
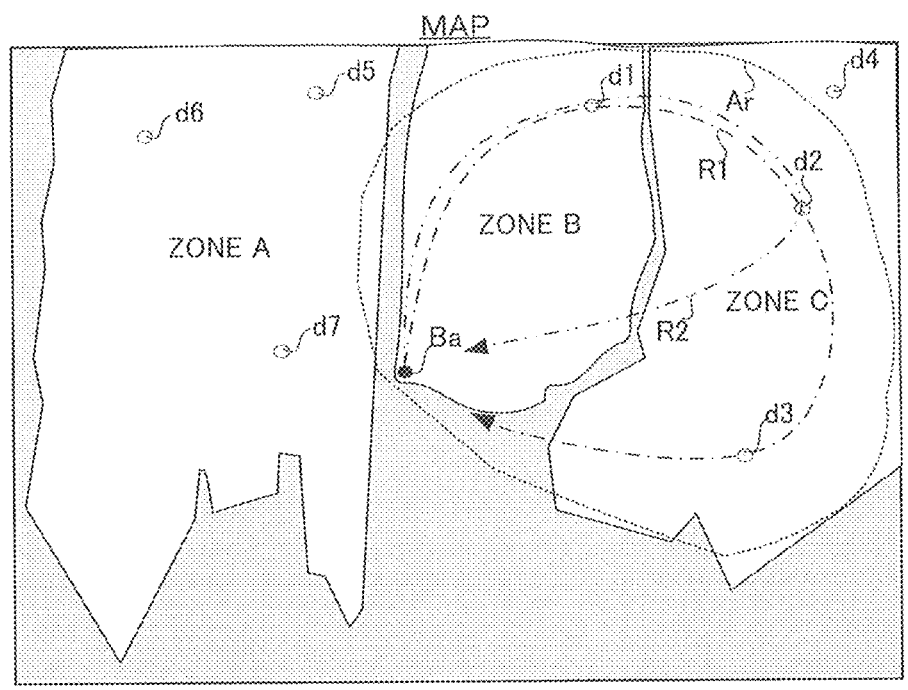
FIG. 11 is a diagram showing delivery routes for delivering articles included in orders on a map.

In step S13, the control unit 23 (delivery route identifying unit 236) identifies a delivery route for delivering the articles included in each order on the basis of the delivery destinations specified by each order identified in step S6 and the like. FIG. 11 is a diagram showing delivery routes for delivering articles included in orders on a map. In a case where all the orders d1 to d3 illustrated in FIG. 7 are identified, as illustrated in FIG. 11, the delivery route R1 passing via the delivery destinations d1 to d3 is identified. On the other hand, in a case where the orders d1 and d2 are identified from among the orders d1 to d3 illustrated in FIG. 7 due to the order d3 being excluded, the delivery route R2 passing via the delivery destinations d1 and d2 is identified, as illustrated in FIG. 11.

Next, the control unit 23 (scheduled flight distance identifying unit 237) identifies the scheduled flight distance of the UAV 1 identified in step S5 on the basis of the delivery route identified in step S13 (step S14). Next, the control unit 23 (cruisable distance calculation unit 238) calculates the cruisable distance of the UAV 1 on the basis of the weights of the articles included in each order identified in step S6 and the like. and the relationship between the cruisable distance and the load weight of the UAV 1 identified in step S5 (step S15). That is, after one or more articles included in some orders are delivered to the delivery destination, the cruisable distance is calculated taking into consideration the portion of only the reduced weights of the one or more articles.

For example, for the delivery route R1 illustrated in FIG. 11, the cruisable distance may be calculated for each section with the same load weight, such as a section with a load weight of 6 kg (a section from the delivery base Ba to the delivery destination d1), a section with a load weight of 5 kg (a section from the delivery destination d1 to the delivery destination d2), a section with a load weight of 2 kg (a section from the delivery destination d2 to the delivery destination d3), and a section with a load weight of 0 kg (a section from the delivery destination d3 to the delivery base Ba3).

Next, the control unit 23 (delivery possibility determination unit 239) compares the scheduled flight distance identified in step S14 with the cruisable distance calculated in step S15 and determines whether or not the scheduled flight distance of the UAV 1 is equal to or less than the cruisable distance of the UAV 1 (step S16). By this configuration, it can be determined whether or not the UAV 1 is capable of loading and delivering the articles included in each of the plurality of orders. In a case where it is determined that the scheduled flight distance of the UAV 1 is not equal to or less than the cruisable distance of the UAV 1 (step S16: NO), it is determined that loading and delivering the articles is not possible, and the process proceeds to step S17. On the other hand, in a case where it is determined that the scheduled flight distance of the UAV 1 is equal to or less than the cruisable distance of the UAV 1 (step S16: YES), it is determined that loading and delivering the articles is possible (that is, a final main determination), the plurality of orders is identified as being subject to the mixed loading delivery, and the process proceeds to step S18.

In step S17, the control unit 23 executes an order filtering process 3. In the order filtering process 3, the control unit 23 identifies a plurality of orders by excluding any one order from among the plurality of orders identified in step S6 and the like. For example, an order (in the example of FIG. 11, the order or2) including a delivery destination having the longest distance from the delivery base (delivery start point) from among the plurality of orders may be excluded. By this configuration, after the plurality of orders is identified again, the process returns to step S13, and the processes from step S13 are performed for the plurality of orders identified. Incidentally, in the loop including step S17, in a case where one order remains as a result of some orders being excluded, the process moves to the process according to the non-mixed loading delivery indicated in step S19.

In step S18, the control unit 23 executes the process according to the mixed loading delivery of the articles included in each of the plurality of orders identified as being subject to the mixed loading delivery in step S16. In the process according to the mixed loading delivery, the control unit 23 assigns the delivery schedule decided in step S1 to the UAV 1 identified in step S5, then registers the delivery schedule in the UAV management database 222 in association with the vehicle ID of the UAV 1. Moreover, the control unit 23 allocates the plurality of orders identified as being subject to the mixed loading delivery to the UAV 1 identified in step S5, then registers the vehicle ID of the UAV 1 in the order management database 221 in association with the respective order IDs of each order.

Further, in the process according to the mixed loading delivery, the control unit 23 (delivery destination information transmission unit 241) transmits the order ID of each order and the delivery destination information indicating the delivery destinations specified by each order to the UAV 1 identified in step S5 via the communication network NW. Then, the control unit 23 notifies a staff member at the delivery base of a load request for the articles included in each of the plurality of orders identified as being subject to the mixed loading delivery. For example, information indicating the load request may be transmitted to the staff member's terminal. By this configuration, the staff member picks and packages the articles included in each of the plurality of orders, then loads the articles onto the UAV 1 allocated to the plurality of orders. After that, the control unit 23 transmits a delivery start command to the UAV 1 to make the UAV 1 start flying toward the delivery destinations specified by each of the orders.

On the other hand, in the process according to the non-mixed loading delivery of step S19, as illustrated in FIG. 6, the control unit 23 identifies a UAV 1 that has not yet been allocated to an order from among the UAVs 1 that have shown up as a hit by the search of step S2 (step S191). Next, the control unit 23 (order identifying unit 233) identifies one order satisfying the conditions regarding delivery, as described above, from among the orders that have showed up as a hit by the search in step S3, and further, have not been identified as being subject to the mixed loading delivery (also including the orders excluded by the filtering processes 1 to 3) (step S192).

Incidentally, also in step S192, as in step S6, the control unit 23 may identify an order that includes articles not impacted by the weather conditions in the delivery area and the delivery time slot on the basis of the attributes of the articles included in the order satisfying the conditions regarding delivery and the weather conditions in the delivery area and the delivery time slot. Alternatively, the control unit 23 may identify an order that includes articles not impacted by the article detachment method of the UAV 1 on the basis of the attributes of the articles included in the order satisfying the conditions regarding delivery and the article detachment method of the UAV 1 identified in step S191.

Next, the control unit 23 (total weight calculation unit 234) calculates the total weight of the articles loaded on the UAV 1 identified in step S191 on the basis of the weights of the articles included in the order identified in step S192 (step S193). There are cases where the order identified in step S192 includes only one article, and cases where the order includes a plurality of articles.

Next, the control unit 23 (delivery possibility determination unit 239) compares the loadable weight of the UAV 1 identified in step S191 with the total weight calculated in step S193 and determines whether or not the total weight of the articles is equal to or less than the loadable weight of the UAV 1 (step S194). In a case where it is determined that the total weight of the articles is not equal to or less than the loadable weight of the UAV 1 (step S194: NO), the process proceeds to step S198. On the other hand, in a case where it is determined that the total weight of the articles is equal to or less than the loadable weight of the UAV 1 (step S194: YES), the process proceeds to step S195.

In step S195, the control unit 23 (total volume calculation unit 235) calculates the total volume of the articles loaded on the UAV 1 identified in step S191 on the basis of the volumes of the articles included in the order identified in step S192. Next, the control unit 23 (delivery possibility determination unit 239) compares the loadable capacity of the UAV 1 identified in step S191 with the total volume calculated in step S195 and determines whether or not the total volume of the articles is equal to or less than the loadable capacity of the UAV 1 (step S196). In a case where it is determined that the total volume of the articles is not equal to or less than the loadable capacity of the UAV 1 (step S196: NO), the process proceeds to step S198. On the other hand, in a case where it is determined that the total volume of the articles is equal to or less than the loadable capacity of the UAV 1 (step S196: YES), a process according to a normal delivery is executed (step S197), and the process proceeds to step S203.

In step S198, the control unit 23 determines whether or not a plurality of articles is included in the order identified in step S192. In a case where it is determined that a plurality of articles is not included in the order (that is, only one article is included) (step S198: NO), a process according to a delivery method other than the UAV 1 is executed (step S199), and the process proceeds to step S203. On the other hand, in a case where it is determined that a plurality of articles is included in the order (step S198: YES), the control unit 23 (divided delivery processing unit 240) identifies the order identified in step S192 as an order subject to the divided delivery, and decides to divide the plurality of articles included in the order and deliver to the delivery destination over a plurality of times (that is, the divided delivery is decided) (step S200).

Next, the control unit 23 (divided delivery processing unit 240) decides the delivery order of each of the plurality of articles on the basis of the respective attributes of the plurality of articles included in the order identified in step S192 (step 3201). Here, the control unit 23 (divided delivery processing unit 240) may decide the delivery order of each of the plurality of articles on the basis of the weather conditions in the delivery area and the delivery time slot of the delivery schedule decided in step S1 and the respective attributes of the plurality of articles included in the order identified in step S192. Incidentally, the decided delivery order is registered in the order management database 221 in association with the article ID of each article.

FIG. 12 is a conceptual diagram illustrating an example of a delivery order of each of a plurality of articles included in one order. In the example of FIG. 12, from among the four articles included in the order, it is decided that the delivery order of the beverages and the processed product, which are not impacted by clear weather, is "leading", and it is decided that the delivery order of the frozen food and the deli items, which are susceptible to the impact of clear weather, is "following". In this case, it is decided to divide the delivery and perform over two times. However, the delivery may be divided and performed over three or more times according to the weights of the articles.

Next, the control unit 23 (divided delivery processing unit 240) executes the process according to the divided delivery of the plurality of articles included in the order identified in step S192 (step S202). In the process according to the divided delivery, the delivery schedule decided in step S1 is assigned to the UAV 1 identified in step S191, and the delivery schedule is registered in the UAV management database 222 in association with the vehicle ID of the UAV 1. Moreover, the control unit 23 allocates the one order identified as being subject to the divided delivery to the UAV 1 identified in step S191, and registers the vehicle ID of the UAV 1 in the order management database 221 in association with the order ID of the order. Further, in the process according to the divided delivery, the control unit 23 (delivery destination information transmission unit 241) transmits the order ID of the order, the delivery destination information indicating the delivery destination specified by the order, and the information indicating the delivery order of each of the articles to the UAV 1 identified in step S191 via the communication network NW. Then, the control unit 23 notifies the staff member at the delivery base of the load request of these articles.

Incidentally, in a case where a plurality of UAVs 1 is shown as a hit by the search of step S2, the "leading" articles may, for example, be allocated to the UAV 1*a* identified in step S191, and the "following" articles may be allocated to the other UAV 1*b*. In this case, the delivery schedule and the like are registered for the UAV 1*a* and the UAV 1*b*. Then, the control unit 23 (delivery destination information transmission unit 241) transmits the order ID of the order, the delivery destination information indicating the delivery destination specified by the order, and the respective information indicating the delivery order of the articles allocated to each of the UAV 1*a* and the UAV 1*b*, to the UAV 1*a* and the UAV 1*b* via the communication network NW. Here, the information indicating the delivery order of the articles assigned to the UAV 1*a* is transmitted to the UAV 1*a*, and the information indicating the delivery order of the articles assigned to the UAV 1*b* is transmitted to the UAV 1*b*.

In step S203, the control unit 23 determines whether or not there are any unprocessed orders that have showed up as a hit by the search in step S3, and further, have not been identified as being subject to the mixed loading delivery. In a case where it is determined that there are unprocessed orders (step S203: YES), the process returns to step S191. By this configuration, the processes from step S191 are performed for the unprocessed orders. On the other hand, in a case where it is determined that there are no unprocessed orders (step S203: NO), the process illustrated in FIG. 6 ends.

As described above, according to the above embodiment, since the embodiment is configured such that the total weight of the plurality of articles loaded on the UAV 1 is calculated on the basis of the weights of the articles included in each of the plurality of orders and the calculated total weight is compared with the loadable weight of the UAV 1 to determine whether or not the UAV 1 is capable of loading and delivering the articles included in each of the plurality of orders, it can be efficiently determined whether or not loading and delivering the articles included in each of the plurality of orders having different delivery destinations on the UAV 1 having a decided maximum loadable weight is possible. Further, according to the above embodiment, in a case where it is determined that loading and delivering the plurality of articles included in the one order is not possible, it is decided to divide the plurality of articles included in the one order and deliver over a plurality of times to the delivery destination, and since the embodiment is configured such that the delivery order of each of the plurality of articles is decided on the basis of the respective attributes of the plurality of articles included in the one order, a reduction in quality of the articles to be delivered to the delivery destination can be prevented as much as possible.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention.

REFERENCE SIGNS LIST

1 UAV
2 Management server
11 Drive unit
12 Positioning unit
13 Communication unit
14 Sensor unit
15 Storage unit
16 Control unit
21 Communication unit
22 Storage unit
23 Control unit
231 UAV search unit
232 Order search unit
233 Order identifying unit
234 Total weight calculation unit
235 Total volume calculation unit
236 Delivery route identifying unit
237 Scheduled flight distance identifying unit
238 Cruisable distance calculation unit
239 Delivery possibility determination unit
240 Divided delivery processing unit
241 Delivery destination information transmission unit
S Delivery System

The invention claimed is:

1. An information processing device for executing a predetermined information processing by referring to a database that stores information regarding an unmanned aerial vehicle used for an article delivery and information regarding orders of articles, the information processing device comprising:

at least one memory configured to store program code; and at least one processor configured to access the program code and operate as instructed by the program code, the program code including:

first identifying code configured to cause the at least one processor to identify a plurality of orders including articles not impacted by unstable weather conditions in a delivery area and a delivery time slot, the articles not impacted by the weather conditions being articles to be delivered by the unmanned aerial vehicle, on a basis of attributes of the articles included in each of the plurality of orders and the weather conditions of the delivery area and the delivery time slot, from among the plurality of orders having delivery destinations that are included in the delivery area for which a flight by the unmanned aerial vehicle is scheduled and having a specified delivery time that is included in the delivery time slot for which the flight by the unmanned aerial vehicle is scheduled, wherein based on the weather conditions including strong winds, articles having an attribute of resistant to impact are included in the order;

first calculation code configured to cause the at least one processor to calculate a total weight of a plurality of articles loaded on the unmanned aerial vehicle on a basis of the weights of the articles included in each of the identified plurality of orders;

determination code configured to cause the at least one processor to determine, by comparing a loadable weight of the unmanned aerial vehicle with the total weight, whether or not the unmanned aerial vehicle is capable of loading and delivering the articles included in each of the plurality of orders;

navigation code configured to cause the at least one processor to, based on determining that the aerial vehicle is capable of loading and delivering the articles, control the unmanned aerial vehicle to move autonomously to a delivery destination; and second identifying code configured to cause the at least one processor to identify a plurality of orders having a specified delivery time that is included in a delivery time slot for which a flight by the unmanned aerial vehicle is scheduled, wherein the first calculation code causes the at least one processor to calculate the total weight of the plurality of articles loaded on the unmanned aerial vehicle on a basis of the weights of the articles included in each of the identified plurality of orders.

2. The information processing device according to claim 1, the program code further including transmission code configured to cause the at least one processor to transmit delivery destination information indicating delivery destinations specified by each of the plurality of orders to the unmanned aerial vehicle according to that it is determined that the unmanned aerial vehicle is capable of loading and delivering the articles.

3. The information processing device according to claim 1, the program code further including:

second identifying code configured to cause the at least one processor to identify a delivery route for delivering the articles included in each of the orders on a basis of the delivery destinations specified by each of the orders; and third identifying code configured to cause the at least one processor to identify a scheduled flight distance of the unmanned aerial vehicle on a basis of the delivery route, wherein the determination code causes the at least one processor to determines, further by comparing the scheduled flight distance of the unmanned aerial vehicle with a cruisable distance of the unmanned aerial vehicle, whether or not the unmanned aerial vehicle is capable of loading and delivering the articles included in each of the plurality of orders.

4. The information processing device according to claim 3, the program code further including:

second calculation code configured to cause the at least one processor to calculate the cruisable distance compared with the scheduled flight distance of the unmanned aerial vehicle on a basis of the weights of the articles included in each of the plurality of orders and a relationship between the cruisable distance and a load weight of the unmanned aerial vehicle, wherein the second calculation code causes the at least one processor to calculates the cruisable distance such that the distance increases according to the weight being reduced due to the articles included in any of the orders being detached from the unmanned aerial vehicle at the delivery destinations.

5. The information processing device according to claim 1, the program code further including:

second identifying code configured to cause the at least one processor to identify a plurality of orders having delivery destinations that are included in a delivery area for which a flight by the unmanned aerial vehicle is scheduled, wherein the first calculation code causes the at least one processor to calculate the total weight of the plurality of articles loaded on the unmanned aerial vehicle on a basis of the weights of the articles included in each of the identified plurality of orders.

6. The information processing device according to claim 1, the program code further including:

second identifying code configured to cause the at least one processor to identify a plurality of orders including articles not impacted by an article detachment method of the unmanned aerial vehicle, on a basis of attributes of the articles included in each of the plurality of orders and the article detachment method of the unmanned aerial vehicle, from among the plurality of orders having delivery destinations that are included in a delivery area for which a flight by the unmanned aerial vehicle is scheduled and having a specified delivery time that is included in a delivery time slot for which the flight by the unmanned aerial vehicle is scheduled, wherein the first calculation code causes the at least one processor to calculates the total weight of the plurality of articles loaded on the unmanned aerial vehicle on a basis of the weights of the articles included in each of the identified plurality of orders.

7. The information processing device according to claim 1, the program code further including:

second calculation code configured to cause the at least one processor to calculate a total volume of the plurality of articles loaded on the unmanned aerial vehicle on a basis of volumes of the articles included in each of the plurality of orders, wherein the determination code causes the at least one processor to determine, by further comparing a loadable capacity of the unmanned aerial vehicle with the total volume, whether or not the unmanned aerial vehicle is capable of loading and delivering the articles included in each of the plurality of orders.

8. The information processing device according to claim 1, wherein:

in a case where it is determined that the unmanned aerial vehicle is not capable of loading and delivering the articles, the first calculation code causes the at least one processor to calculates the total weight of the plurality of articles loaded on the unmanned aerial vehicle on a basis of the weights of the plurality of articles included in any one order from among the plurality of orders; and the determination code causes the at least one processor to determine, by comparing the loadable weight of the unmanned aerial vehicle with the total weight, whether or not the unmanned aerial vehicle is capable of loading and delivering the plurality of articles included in the one order, wherein the one order has a single delivery location.

9. The information processing device according to claim 8, the program code further including a decision code configured to cause the at least one processor to, in a case where it is determined that the unmanned aerial vehicle is not capable of loading and delivering the articles, decide to divide the plurality of articles included in the order and deliver to delivery destinations over a plurality of times, and decide a delivery order of each of the articles on a basis of respective attributes of each article.

10. The information processing device according to claim 9, wherein the decision code causes the at least one processor to decides the delivery order of each of the articles on a basis of weather conditions in a delivery time slot for which a flight by the unmanned aerial vehicle is scheduled and a delivery area for which the flight by the unmanned aerial vehicle is scheduled, and the respective attributes of each of the articles.

11. An information processing method performed by a computer that executes a predetermined information processing by referring to a database that stores information regarding unmanned aerial vehicles used for an article delivery and information regarding orders of articles, the information processing method including:
    identifying a plurality of orders including articles not impacted by unstable weather conditions in a delivery area and a delivery time slot, the articles not impacted by the weather conditions being articles to be delivered by the unmanned aerial vehicle, on a basis of attributes of the articles included in each of the plurality of orders and the weather conditions of the delivery area and the delivery time slot, from among the plurality of orders having delivery destinations that are included in the delivery area for which a flight by the unmanned aerial vehicle is scheduled and having a specified delivery time that is included in the delivery time slot for which the flight by the unmanned aerial vehicle is scheduled, wherein based on the weather conditions including strong winds, articles having an attribute of resistant to impact are included in the order;
    calculating a total weight of a plurality of articles loaded on the unmanned aerial vehicle on a basis of the weights of the articles included in each of the identified plurality of orders;
    comparing a loadable weight of the unmanned aerial vehicle with the total weight and determining whether or not the unmanned aerial vehicle is capable of loading and delivering the articles included in each of the plurality of orders;
    based on determining that the aerial vehicle is capable of loading and delivering the articles, controlling the unmanned aerial vehicle to move autonomously to a delivery destination;
    identifying a plurality of orders having a specified delivery time that is included in a delivery time slot for which a flight by the unmanned aerial vehicle is scheduled; and
    calculating the total weight of the plurality of articles loaded on the unmanned aerial vehicle is based on the weights of the articles included in each of the identified plurality of orders.

12. A delivery system comprising:
    a database configured to store information regarding unmanned aerial vehicles used for an article delivery and information regarding orders of articles;
    at least one memory configured to store program code; and
    at least one processor configured to access the program code and operate as instructed by the program code, the program code including:
        identifying code configured to cause the at least one processor to identify a plurality of orders including articles not impacted by unstable weather conditions in a delivery area and a delivery time slot, the articles not impacted by the weather conditions being articles to be delivered by the unmanned aerial vehicle, on a basis of attributes of the articles included in each of the plurality of orders and the weather conditions of the delivery area and the delivery time slot, from among the plurality of orders having delivery destinations that are included in the delivery area for which a flight by the unmanned aerial vehicle is scheduled and having a specified delivery time that is included in the delivery time slot for which the flight by the unmanned aerial vehicle is scheduled, wherein based on the weather conditions including strong winds, articles having an attribute of resistant to impact are included in the order;
        acquisition code configured to cause the at least one processor to acquire weights of a plurality of articles loaded on the unmanned aerial vehicle, which are the articles included in each of the plurality of orders, and a loadable weight of the unmanned aerial vehicle from the database before the delivery is started;
        calculation code configured to cause the at least one processor to calculate a total weight of the plurality of articles by adding up the weights of the plurality of articles acquired by the acquisition unit;
            determination code configured to cause the at least one processor to determine, by comparing the loadable weight of the unmanned aerial vehicle with the total weight, whether or not the unmanned aerial vehicle is capable of loading and delivering the articles included in each of the plurality of orders; and
        navigation code configured to cause the at least one processor to, based on determining that the aerial vehicle is capable of loading and delivering the articles, control the unmanned aerial vehicle to move autonomously to a delivery destination; and
        second identifying code configured to cause the at least one processor to identify a plurality of orders having a specified delivery time that is included in a delivery time slot for which a flight by the unmanned aerial vehicle is scheduled, wherein
    the calculation code causes the at least one processor to calculate the total weight of the plurality of articles loaded on the unmanned aerial vehicle on a basis of the weights of the articles included in each of the identified plurality of orders.

13. The information processing device according to claim 9, wherein the articles are divided according to weather resistance attributes of the articles.

14. The information processing device according to claim 13, wherein the decision code causes the at least one processor to decides the delivery order of each of the articles on a basis of weather conditions in a delivery time slot for which a flight by the unmanned aerial vehicle is scheduled and a delivery area for which the flight by the unmanned aerial vehicle is scheduled, and the weather resistance attributes of the articles.

* * * * *